United States Patent Office 3,515,729
Patented June 2, 1970

3,515,729
PROCESS FOR THE PRODUCTION OF BROMINATED PHTHALOCYANINES
Istvan Toth, Basel, and Walter Frey, Muttenz, Basel-Land, Switzerland, assignors to Sandoz Ltd. (also known as Sandoz A.G.), Basel, Switzerland
No Drawing. Filed Nov. 13, 1967, Ser. No. 682,521
Claims priority, application Switzerland, Nov. 15, 1966, 16,400/66; Mar. 10, 1967, 3,481/67; Mar. 15, 1967, 3,987/67
Int. Cl. C09b 47/10
U.S. Cl. 260—314.5                 6 Claims

ABSTRACT OF THE DISCLOSURE

Bromination of phthalocyanines by suspending the phthalocyanine in liquid bromine, together with a compound of formula

as reaction accelerant,
wherein
X stands for NaO—, KO—, ZO— or $NH_2$ and
Y stands for NaO—, KO—, ZO— or HO— or
X and Y jointly stand for

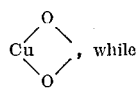, while

Z represents an ammonium group
and maintaining the suspension at temperatures between 150° C. and 300° C. until bromination is sufficient.

DESCRIPTION

It has been found that valuable brominated phthalocyanine derivatives of yellowish green colour, in particular such derivatives having more than 13.7 and up to 16 bromine atoms in the molecule, are obtainable in good yield and purity and under technically advantageous conditions, i.e., at relatively low temperatures and pressures, when the phthalocyanine is suspended in liquid bromine, together with a compound of formula

as reaction accelerant, and the suspension maintained at temperatures between about 150° C. and 300° C., or more specifically between 160° C. and 230° C., until bromination is sufficient. In this formula X stands for NaO—, KO—, ZO— or $NH_2$ and
Y stands for NaO—, KO—, ZO— or HO— or
X and Y jointly stand for

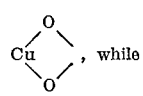, while

Z represents an ammonium group.

The following are named to exemplify the reaction accelerants which are particularly suitable for the present process: acid or neutral alkali sulphates, e.g., $Na_2SO_4$, $K_2SO_4$, $NaHSO_4$ or $KHSO_4$; ammonium sulphates, e.g., $(NH_4)_2SO_4$, $(NH_4)HSO_4$; alkylammonium sulphates, such as dimethylammonium sulphate; copper sulphate, e.g., $CuSO_4$; sulphamic acid ($H_2N$—$SO_3H$) or its alkaline salts, particularly the sodium or potassium salts; and its ammonium salt. Should the aim be to produce phthalocyanine derivatives of particularly high bromine content, e.g., with more than 15 bromine atoms in the molecule, it is advisable to conduct the reaction at temperatures above 190° C. Given this condition, a substantial amount of bromine can be introduced into the phthalocyanine molecule at pressures ranging from about 10 to 50 atmospheres or within the optimum pressure range of 20 to 40 atmospheres.

All the known metal-containing phthalocyanines, e.g., copper, zinc, cobalt and nickel phthalocyanines, are amenable to bromination by the present process. The aromatic rings in the phthalocyanine molecule may be substituted to a slight extent, for example, by chlorine atoms. The less water present in the reaction, the better are the results; hence anhydrous bromine is preferable. This is employed in amounts sufficient to hold in suspension the phthalocyanine that is to be brominated; approximately 10 to 50 or, preferably, 20 to 40 parts by weight of bromine to 1 part by weight of phthalocyanine are used.

The reaction accelerants suitable for the process of this invention may be employed singly or in admixture with each other, for example in amounts of 0.5 to 6 parts or more, particularly 1 to 5 parts, by weight to 1 part by weight of phthalocyanine.

The bromination of phthalocyanines with the addition of sulphates, e.g., alkali sulphates, is known. These reactions however are carried out in the melt of an inorganic salt, usually aluminum chloride or iron chloride, which dissolves the phthalocyanine added for bromination. The fact that the phthalocyanines are in solution precludes the production in good yield of phthalocyanine derivatives having a high bromine content and no appreciable chlorine content. Further, phthalocyanines have been converted into their bromine derivatives by heating in liquid bromine, but this technique has not proved successful for producing phthalocyanine derivatives bearing 14 to 16 bromine atoms in the molecule. What is more, the hydrogen bromide set free in the course of the reaction increases very considerably the pressure inside the reaction vessel, which makes it necessary to use equipment built to withstand high pressures. In the process here disclosed the hydrogen bromide formed is bound, so that essentially only the partial pressure of the bromine determines the total pressure.

In the examples the parts and percentages are by weight and the temperatures in degrees centigrade.

EXAMPLE 1

In a pressure vesel a suspension of 3 parts of copper phthalocyanine in 63 parts of bromine and 6 parts of ammonium sulphate is maintained at 200° for 16 hours at a pressure of 20 to 25 atmospheres. The compound thus formed contains 3% copper, 0.67% chlorine and 68.6% bromine, which is equivalent to 15.3 bromine atoms per molecule of phthalocyanine.

The bromination reaction may be conducted in the same way but at 160° and 12–14 atmospheres pressure to yield a product containing 14.2 bromine atoms in the molecule.

EXAMPLE 2

Three parts of copper phthalocyanine are suspended in 63 parts of bromine and 8.8 parts of sulphamic acid in a pressure vessel, and the suspension is held at 200° for 16 hours under a pressure of approximately 25 atmospheres. The reaction yields a compound containing 16 bromine atoms in the phthalocyanine molecule.

EXAMPLE 3

A suspension of 3 parts of copper phthalocyanine in 63 parts of bromine and 10.2 parts of ammonium sulphamate is maintained at about 200° for 16 hours, during which time the reaction pressure increases from 20 to 25 atmospheres. The product is a phthalocyanine having on the average 15.8 bromine atoms in the molecule.

EXAMPLE 4

The suspension consists of 3 parts of copper phthalocyanine in 63 parts of bromine and 6.2 parts of sodium sulphate ($Na_2SO_4$) and it is held at 200° in a pressure vessel for 16 hours at a pressure of approximately 25 atmospheres. On isolation a product is obtained having on the average 15.2 bromine atoms in the molecule.

EXAMPLE 5

A suspension of 3 parts of copper phthalocyanine in 63 parts of bromine and 7.7 parts of potassium sulphate ($K_2SO_4$) in a pressure vessel is maintained for 16 hours at 200° and 20–25 atmospheres pressure. The resulting copper phthalocyanine derivative has 16 bromine atoms in the phthalocyanine molecule.

EXAMPLE 6

Three parts of nickel phthalocyanine are suspended in 63 parts of bromine and 6 parts of ammonium sulphate and the suspension is held at 200° for 32 hours. The compound thus formed contains 15.9 bromine atoms in the molecule.

EXAMPLE 7

A suspension is prepared with 3 parts of copper phthalocyanine in 65 parts of bromine and 14 parts of anhydrous copper sulphate and it is maintained at 200° for 16 hours to yield a product containing 15.6 bromine atoms in the molecule.

EXAMPLE 8

A mixture of 3 parts of copper phthaloycanine, 3 parts of ammonium sulphate and 126 parts of bromine is maintained at 200° for 16 hours to yield a product having 15 bromine atoms in the molecule.

Having thus disclosed the invention what we claim is:

1. A process for brominating metal-containing phthalicyanine which comprises suspending 1 part by weight of metal-containing phthalocyanine in from approximately 10 to 50 parts by weight of liquid bromine, together with a reaction accelerant of the formula

wherein

X is a member selected from the group consisting of —NOa, —OK, —OZ and —$NH_2$;

Y is a member selected from the group consisting of —ONa, —OK, —OZ and —OH;

X and Y jointly are, alternatively,

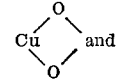

Z is an ammonium group;

and maintaining the resulting suspension at temperatures between 150° and 300° C. and under a pressure of from 10 to 50 atmospheres until bromination is sufficient.

2. In phthalocyanine bromination according to claim 1 the improvement wherein a suspension in bromine consisting essentially of (a) 1 part by weight of metal-containing phthalocyanine, (b) 10 to 50 parts by weight of liquid bromine and (c) 0.5 to 6 parts by weight of the reaction accelerant is maintained at a temperature from 150° to 300° C. until bromination is sufficient.

3. Phthalocyanine bromination according to claim 2 wherein the temperature is maintained above 190° C. until a phthalocyanine is produced with more than 15 bromine atoms in the molecule.

4. Phthalocyanine bromination according to claim 2 wherein the metal is a member selected from the group consisting of copper, zinc, cobalt and nickel and said suspension contains from 20 to 40 parts by weight of bromine and from 1 to 5 parts by weight of reaction accelerant per part by weight of metal-containing phthalocyanine.

5. Phthalocyanine bromination according to claim 2 wherein the metal-containing phthalocyanine is copper phthalocyanine and the bromination is sufficient to produce copper phthalocyanine having an average bromine content of more than 13.7 and up to 16 bromine atoms per molecule.

6. Phthalocyanine bromination according to claim 2 wherein the metal-containing phthalocyanine is nickel phthalocyanine and the bromination is sufficient to produce nickel phthalocyanine having an average bromine content of more than 13.7 and up to 16 bromine atoms per molecule.

References Cited

FOREIGN PATENTS 838,009 1939 France.
932,943 1963 Great Britain.

HENRY R. JILES, Primary Examiner

H. I. MOATZ, Assistant Examiner

UNITED STATES PATENT OFFICE
CERTIFICATE OF CORRECTION

Patent No. 3,515,729                    Dated June 2, 1970

Inventor(s) ISTVAN TOTH, WALTER FREY

It is certified that error appears in the above-identified patent and that said Letters Patent are hereby corrected as shown below:

Column 4, line 3, "-NOa" should read -- -ONa--.

SIGNED AND
SEALED
NOV 17 1970

NOV. 17, 1970

(SEAL)
Attest:

Edward M. Fletcher, Jr.
Attesting Officer

WILLIAM E. SCHUYLER, JR.
Commissioner of Patents